(12) United States Patent
Schucker

(10) Patent No.: US 6,861,100 B1
(45) Date of Patent: Mar. 1, 2005

(54) METHOD AND ARRANGEMENT FOR PRODUCING BODY COMPONENTS BEING PROVIDED WITH A SILENCING MATERIAL LAYER

(75) Inventor: Josef Schucker, Karlsruhe (DE)

(73) Assignee: SCA Schucker GmbH & Co., Bretten (DE)

( * ) Notice: Subject to any disclaimer, the term of this patent is extended or adjusted under 35 U.S.C. 154(b) by 174 days.

(21) Appl. No.: 10/130,967

(22) PCT Filed: Sep. 30, 2000

(86) PCT No.: PCT/EP00/09622

§ 371 (c)(1),
(2), (4) Date: May 23, 2002

(87) PCT Pub. No.: WO01/38006

PCT Pub. Date: May 31, 2001

(30) Foreign Application Priority Data

Nov. 23, 1999 (DE) ........................................ 199 56 335

(51) Int. Cl.⁷ ................................................ B05D 1/36
(52) U.S. Cl. .................. 427/407.1; 427/409; 427/385.5
(58) Field of Search ............................. 427/407.1, 409, 427/385.5

(56) References Cited

U.S. PATENT DOCUMENTS

| 3,959,048 A | * | 5/1976 | Stanfield et al. | ............... 156/94 |
| 4,569,869 A | | 2/1986 | Kushida et al. | ............ 428/35.7 |
| 4,743,634 A | * | 5/1988 | Royer | ........................ 523/150 |
| 5,418,040 A | | 5/1995 | Kaneko et al. | .......... 428/195.1 |
| 5,843,501 A | * | 12/1998 | Rubin et al. | ................. 426/127 |

FOREIGN PATENT DOCUMENTS

| EP | 77987 A | * | 5/1983 | ............. B32B/7/02 |
| EP | 0 336 138 A1 | | 10/1989 | ........... B05C/11/10 |
| EP | 0 723 843 A2 | | 7/1996 | ............ B29B/7/76 |
| JP | 63 028475 | | 7/1988 | ............. B05D/7/14 |
| JP | 01 199030 | | 11/1989 | ............... F16F/7/00 |
| JP | 03 010831 | | 3/1991 | ........... B29C/65/52 |
| JP | 04 031185 | | 5/1992 | ........... B62D/25/08 |
| JP | 10264280 | * | 10/1998 | ............. B32B/7/02 |
| JP | 10 264280 | | 1/1999 | ............. B32B/7/02 |
| JP | 11 080599 | | 6/1999 | ............ C09D/5/00 |
| WO | WO 96/08319 A | | 3/1996 | ............. B05C/9/06 |
| WO | WO 97/48579 | | 12/1997 | ........... B60R/13/08 |

* cited by examiner

Primary Examiner—Elena Tsoy
(74) Attorney, Agent, or Firm—Pendorf & Cutliff

(57) ABSTRACT

The invention relates to a method and an arrangement for producing body components (48) being provided with an acoustically-effective silencing material layer (44). The aim of the invention is to enable fully automatic packaging making use of the silencing material layer (44). The silencing material that consists of a plastic material which can be cured in a thermal manner is applied onto a flat surface of a body component in a pasty, moisture-absorbing form as a layer (44), and the exposed side of the silencing material layer is covered with a cover layer (46) that facing the body component flat surface. The over layer consists of moisture-impermeable material. The thus pre-packed body component (48) can be randomly transported, intermediately stored and/or supplied for further processing under exposure to air. Curing of the silencing material (44) is only carried out in a subsequent procedure step, for example in an enameling oven.

8 Claims, 4 Drawing Sheets

METHOD AND ARRANGEMENT FOR PRODUCING BODY COMPONENTS BEING PROVIDED WITH A SILENCING MATERIAL LAYER

CROSS REFERENCE TO RELATED APPLICATION

This application is a national stage of PCT/EP00/09622 filed Sep. 30, 2000 and based upon DE 199 56 335.7 filed Nov. 23, 1999 under the International Convention.

BACKGROUND OF THE INVENTION

1. Field of the Invention

The invention concerns a method and an arrangement for production of body components, upon one broad side surface of which a strip-shaped layer of a silencing or sound insulating material is applied.

2. Description of the Related Art

In automobile construction it is conventional to adhere in body components, in particular in doors, roofs or vehicle floors, an acoustically effective damping material. The damping or silencing material is comprised for example of a bituminous mat, which is self-adhered to an inner broad surface of the body part. The adhering of the silencing material conventionally occurs upon the primer prior to the final painting. In this process condition the construction component is already completely assembled. In accordance therewith it is difficult to have access to the area to which the silencing material mat is to be adhered. In the case of a door, this area to be silenced is situated in the internal space for receiving of a rolled down window. The assembly is only possible manually. In connection therewith, errors in assembly can easily occur, which can result in displacement or dislocation of corners, with the consequence of operational defects for example during the operation of a window.

SUMMARY OF THE INVENTION

Beginning therewith it is the task of the present invention to develop a process which makes possible the fully automatic application of the silencing material in the raw construction component condition of the vehicle body component.

The inventive solution is based upon the concept that, as the silencing material layer, a thermally curable synthetic resin or plastic material, hereafter simply referred to as plastic, in viscous form is applied upon the inwardly facing broad surface of a raw construction component, that is, upon a freely accessible individual part, such as for example the exposed sheet metal of a vehicle door. Materials which are suitable for acoustic purposes, such as epoxy resin or PVC, take up humidity when in the pasty condition. If one does not prevent the uptake of moisture, then later during curing in the enameling oven bubbles or blisters occur, which detract from the appearance of the outer surface and can lead to corrosion problems. Accordingly, the silencing layer must be protected against uptake of moisture, so that a intermediate storage and/or a further processing of the raw material component up until the final installation, even following prolonged periods of time, is possible.

In order to achieve this, there is in accordance with a first embodiment of the invention proposed, that the silencing material comprised of a thermally securable or adherable plastic is applied in pasty form upon the broad side surface of the raw construction component as a layer and on the free broad side layer surface is covered over a non-releasably with a moisture impermeable material as a cover layer. The thus prepackaged body part can be stored under exposure to air and/or be subjected to a further processing. The actual securing of the silencing material occurs only in a later process step, preferably following the painting by heating in an enameling oven.

According to a preferred embodiment of the invention the insulating material is extruded upon a broad surface of the raw construction component over a large surface by use of broad-slit nozzle.

The cover layer can be applied together with the silencing material in a coextrusion process in pasty form and subsequently be hardened to form a moisture impermeable layer.

Alternatively thereto, the cover layer can be withdrawn as a sheet or foil from a roll and, during the application of the silencing material, can be large-surface-area bonded with the free exposed surface thereof. In order to prevent the occurrence of folds in the area of the cover layer, the foil can be withdrawn from a form-giving roll and be applied contour-correctly with the silencing material layer. In particular the cover layer can thereby be provided, via circumference ridges in the form-giving roll, with material changing stiffening corrugations or reinforcing seams. As foil materials one could consider for example a metal foil, preferably an aluminum foil. In principle also a plastic foil can be employed.

An alternative methodology envisions that as the silencing material a two component reaction material or resin is employed, of which the reactive components are mixed in a broad slit mixing nozzle under formation of viscous reaction mixture, and via their nozzle opening are applied upon the broad surface of the raw construction component and there are reacted under further processing with formation of a moisture resistant barrier layer.

A further alternative process envisions that the silencing material, comprised of a material which cross-linkable or curable under the influence of UV-light, is applied in viscous form upon the broad surface of a raw construction component and on the exposed broad layer surface is irradiated with UV-light and thereby is sealed over the outer surface, and that the thus prepackaged automobile body part is temporarily stored under exposure to air and/or is subjected to a further processing and is heated in a later process step, preferably in an enameling oven, with simultaneous curing of the silencing material.

In accordance with the inventive technique it is also possible that a first soft-hardening silencing material and a second rigid-hardening silencing material are applied in a sandwich-like manner, one above the other, in viscous form upon the broad surface of a raw construction component and surface-sealed on the exposed broad layer, and that the thus prepackaged body part is stored temporarily under exposure to air and/or subjected to a further processing and in a later process step with simultaneous curing of the silencing material is heated preferably in an enameling oven. The body components produced in this manner are characterized in that the soft core material is not apparent on the outer skin of the body part while the stiffer hardening material forms the acoustically effective silencing layer.

The facilities for carrying out the inventive process include therein an application station for silencing materials, which can be designed variously depending upon the mode of the process.

According to a first embodiment of the device at least two broad-slit nozzles are provided sequentially in the application direction, which respectively are controlled by a robot controllable controlled metering device and are supplied with viscous materials hardening to different hardness. Preferably therein the forward broad slit nozzle in the application direction is supplied with a thermally curable silencing material and the latter broad slit nozzle in the application direction is supplied with a silencing material moisture hardenable to a higher density. The dense material layer has the task of protecting the silencing material against hardening until a later point in time, for example in the enameling oven, that is, to protect it against moisture penetration.

With this application technique it is also possible to produce a vehicle construction component which exhibits a soft hardening core layer and a stiffly hardening cover layer. For this purpose the forward broad slit nozzle in the application direction is supplied with a soft hardening silencing material and the downstream broad slit nozzle in the application direction is supplied with a dense stiffly hardening silencing material. In order to be able to independently influence the viscosities of the silencing and dense materials it is of advantage when the broad slit nozzles respectively exhibit controllable heating devices with associates temperature regulators.

In an alternative system configuration, the application station exhibits a broad slit mixed or co-extrusion nozzle, of which the inlet of the upstream mix stage is connected with two robot controlled controllable metering devices for the reaction components of a reaction resin. The mixing stage is therein preferably designed as a static or dynamic (driven) mixer. For improvement of the cleanability the broad slit mixing nozzle preferably is comprised of at least two separable pressure-tight metal shells, which could include an exchangeable plastic insert as a disposable part. Alternatively, the metal shells could be coated with a separation material, preferably of tetrafluoroethylene (Teflon), which prevents a adhering of the hardened reaction resin.

According to a further alternative embodiment of the invention the application station includes a robot control metering device for supplying a broad slit nozzle with a viscous silencing material, as well as a UV-light source for surface-sealing of the silencing material layer applied via the broad slit nozzle. The surface sealing ensures that the silencing material layer is protected against moisture during the intermediate storage and the transport of the vehicle body part.

In a further equipment variation the application station exhibits a robot controlled dosing meter with a viscous silencing material supplied broad slit nozzle, as well as a robot controlled foil or sheet dispenser for application of a moisture impermeable sheet or foil of metal or plastic upon the viscous silencing material layer applied via the broad slit nozzle.

With the process and equipment variations according to the present invention, prepackaged vehicle body components are produced, of which the silencing material layer comprises a pasty core layer and a moisture impermeable cover layer or surface sealing layer or skin. As an alternative thereto, it is also possible to produce a body component of which the silencing material layer includes a soft hardened core layer and a stiff hardened cover layer. Depending upon the application, the core and cover layer can be of various thicknesses.

BRIEF DESCRIPTION OF THE DRAWING

In the following the invention will be described in greater detail on the basis of the illustrative embodiments shown in schematic manner in the figures. There is shown in FIG. 1a a schematic of an application station for application of silencing material for vehicle body components with two separate layer-forming broad slit nozzles.

DETAILED DESCRIPTION OP THE INVENTION

The application stations represented schematically in the figures are for the coating of vehicle body components 48 in the pre-assembled state with silencing materials by means of a robot 35. The prepackaged vehicle body components 48 provided with the silencing material layer 44 are stored temporarily under exposure to air and/or subjected to a further processing and in a later processing step are heated with simultaneous curing of the insulating material, preferably in a enameling oven. The vehicle body components are so prepared or treated in the application station that the silencing materials which are still in the pasty state are protected or sealed against moisture or humidity penetration.

Figure 1A:
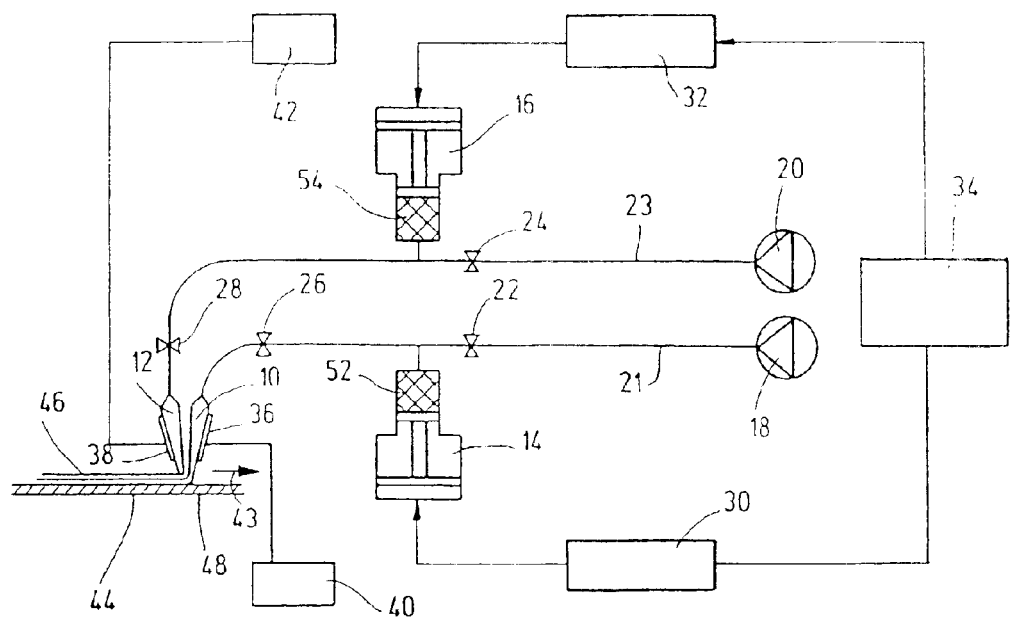
FIG. 1b an enlarged section taken from FIG. 1a at the area of the nozzle opening.
Figure 1B:
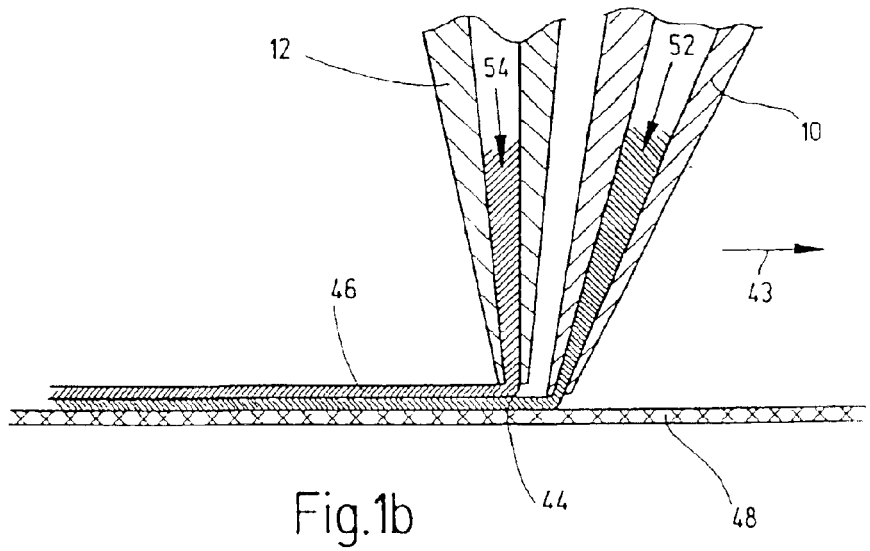

The application or coating station shown in FIGS. 1a and 1b as well as 5 includes two broad-slit nozzles 10, 12, which are supplied by separate metering devices 14, 16 with different viscosity plastic materials 52, 54. The supplying of material to the metering devices 14, 16 occurs via material pumps 18, 20 which receive the material from not-shown material supply containers. In the material supply lines 21, 23 before and after the metering devices 14, 16 there is respectively one ball valve 22, 24 as well as 26, 28. The metering means 14, 16 are respectively controlled by one metering control 30, 32, which are connected to two outlets of the robot control 34. The broad slit nozzles 10, 12 include, besides this, a heating device 36, 38 which is controllable via respectively one temperature controller 40, 42.

The broad slit nozzles 10, 12 are supplied, via the metering devices 30, 32, preferably with respectively one predetermined metering or dose amount per unit of time. The amount control (volume control) occurs therein independent of the material viscosity. The controlling of the metering device occurs therein in dependence upon the speed via the robot control 34. The two outputs of the robot control 34 are freely programmable. Thus it is possible via the two broad-slit nozzles 10, 12 to apply different layer thicknesses, as required.

Generally, via the broad slit nozzle 10 which is most forward in the application direction 43, a layer 44 of acoustically effective silencing material is applied, while via the broad slit nozzle 12 preferably a moisture impermeable cover layer 46 is applied. The cover layer 46 can therein be thinner than the silencing layer 44. As the result, one obtains a prepackaged vehicle body part 48, which is provided with a not-yet cured or hardened silencing layer 44 and a cover layer 46 which protects the silencing layer 44 against moisture penetration. The vehicle body construction part 48 is, for example, the external sheet-metal for an automobile door. This automobile sheet metal can be temporarily stored and transported with exposure to air without concern for damage of the silencing material layer 44, and at a later time and a different place be assembled to the complete door and be painted in a paint facility. The silencing material in the layer 44 is in this case preferably completely cured or hardened at elevated temperature in the enameling oven.

The application or coating station shown in FIGS. 1a and 1b can also be used for production of other sandwich-like layers. Thus, there can be employed for the core layer 44 for example a soft hardening material 52, which does not mark the sheet metal outer skin after hardening. The cover layer 46 is in this case employed as acoustic effective dampening layer, which stiffly hardens to an appropriately thick wall thickness and is cushioned by the soft core layer 44 against the vehicle sheet metal 48.

Figure 2:
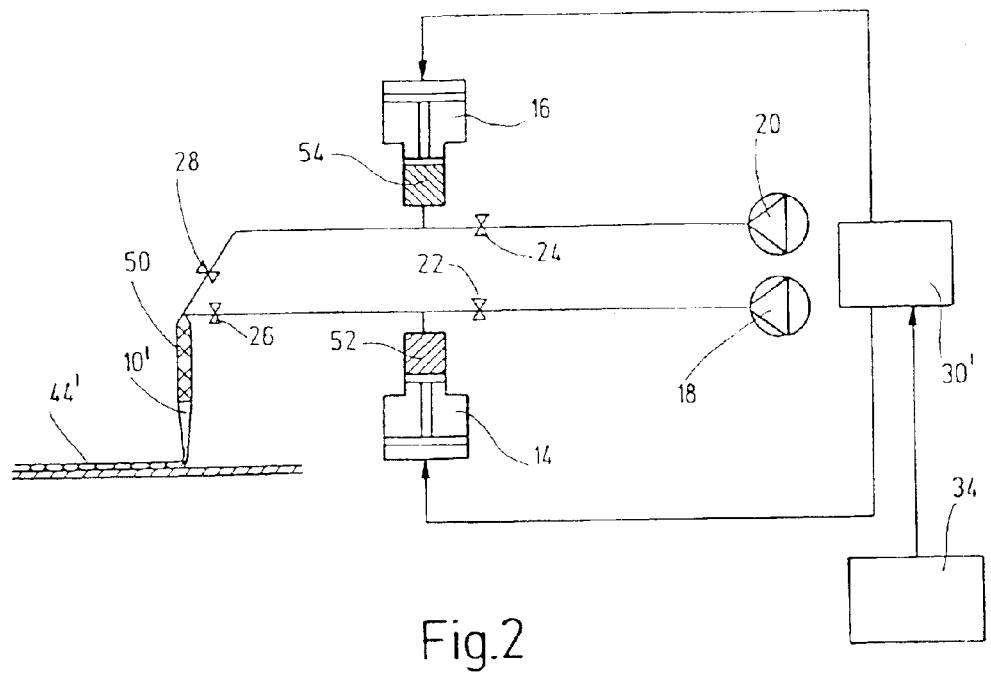
FIG. 2 a schematic of an application station with a broad slit mixing nozzle.

In the illustrative embodiment shown in FIG. 2, in place of the two broad-slit nozzles 10, 12 for co-extrusion of two different viscosity materials, one broad slit mix nozzle 10' is provided, which includes on the inlet side preferably a static mixer 50, which is supplied with the two reaction components 52, 54 of a reaction resin via the metering device 14, 16 and the material pumps 18, 20. The control of the metering device 14, 16 occurs herein via a two-component dosing control 30', which for its part is controllable via the robot control 34 depending upon speed. As a result, one obtains thereby a silencing material layer 44' exiting from the broad slit mix nozzle 10' in the form of strips, which hardens due to the reaction of the two components 52, 54 on the vehicle sheet metal 48 soon after application, and protects the silencing material layer 44 against moisture penetration.

Figure 3:
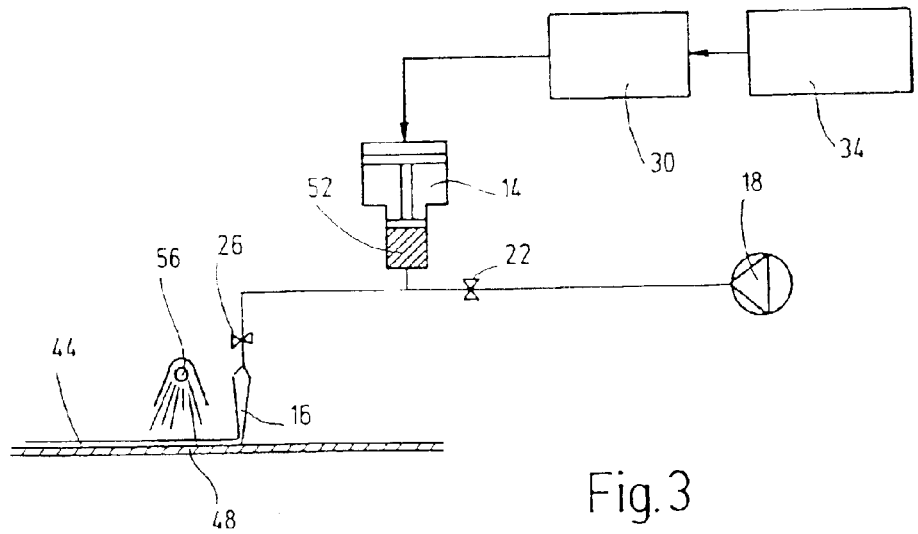
FIG. 3 a schematic of an application station with a broad slit nozzle and subsequent UV-lamp.

In the illustrative embodiment according to FIG. 3 only one broad slit nozzle 10 is provided, which is supplied via one metering device 14 and one material pump 18 with silencing material 52. The control of the amount occurs herein via a metering control 30 which is controlled via the speed-dependent robot control 34.

In the direction of application subsequent to the broad slit nozzle 10 there is a UV-lamp 56, which ensures that the silencing material layer 44 applied via the broad slit nozzle 10 upon the vehicle body sheet metal 48 is sealed or skinned by UV-cross linking in the surface area, providing protection against moisture penetration. The complete curing or hardening of the silencing material layer 44 occurs here also only at a later point in time by thermal activation, for example in a enameling oven.

Figure 4:
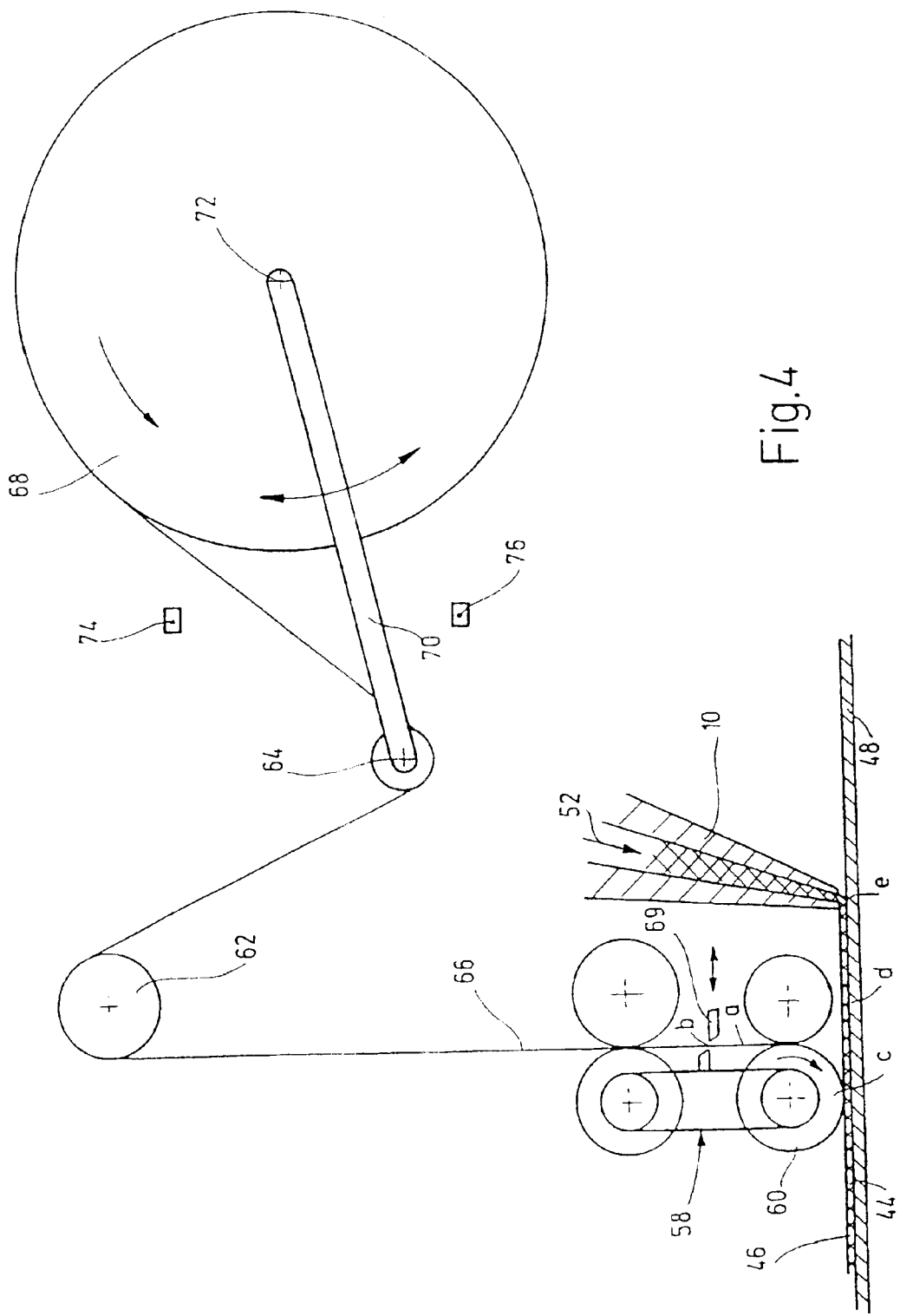
FIG. 4 a schematic of an application station with a broad slit nozzle and subsequent foil or sheet dispenser.
Figure 5:
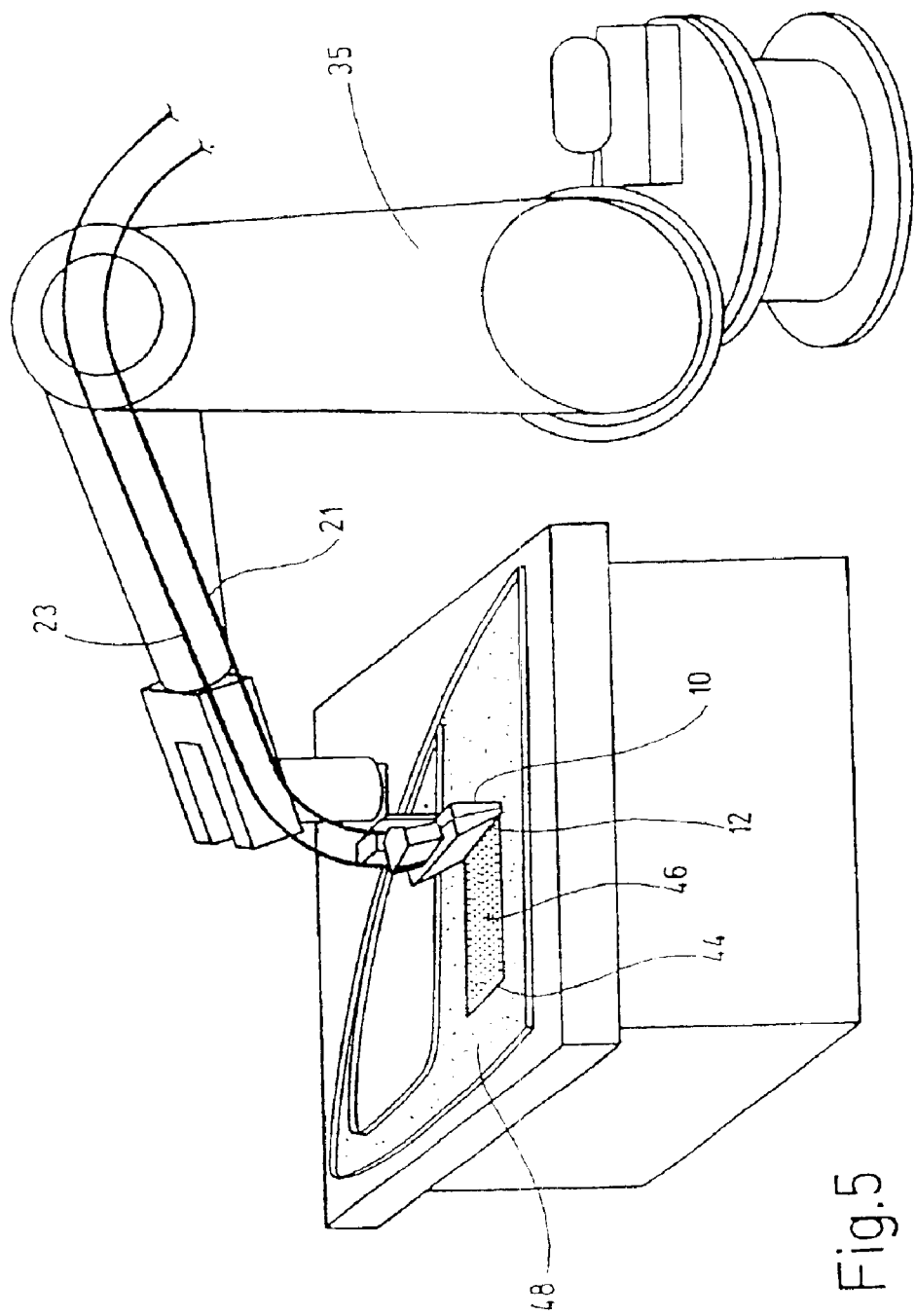
FIG. 5 an application station for application of silencing materials upon vehicle body components in perspective representation.

In the illustrative embodiment of an application station shown in FIG. 4 there is likewise provided only one application nozzle 10, which similarly to the case of FIG. 3 is supplied via metering means with a silencing material 52. In the direction of application subsequent to the broad slit nozzle 10 there is a sheet or foil dispenser 58, which via the driven roller system 60 and the redirection rollers 62, 64 draws a plastic foil 66 of suitable breadth from a supply roll 68 and applies this to the surface of the silencing material 44 applied via the broad slit nozzle 10 upon the vehicle body sheet metal 48 to thereby form a cover layer 46. The withdrawal of the foil is therein likewise controlled, depending upon the speed of the body part, via the robot control. The foil supply 58 further includes a cutting device 69 for separation of the foil belt 66 at the end of the silencing material layer 44. It is advantageous thereby, when the distance d between the positions c and e is selected to be longer than the distance a between the positions b and c, so that it is not necessary during the movement of the robot, that is, during the application of the silencing material layer 44, to cut the foil 66. The lever 70 carrying the redirection roller 64, which is pivotable about the axis 72 of the supply roll 68, and the two sensors 74, 76 ensure that an uninterrupted or undisturbed extraction of foil occurs. The sensor 74 therein serves for switching on of the motor of the supply roll 68 via the high contracting or free-floating lever 70, while the sensor 76 actuated via the lever 70 switches off the drive motor of the supply roll. The amount of foil withdrawn between the two sensors 74, 76 should be sufficient in order to lay a belt 46 over the silencing material layer 44 on the vehicle body component 48. Accordingly, disturbances or interruptions in the extraction of foil caused on the basis of the mass moment of inertia of the supply roll 68 are avoided.

In summary the following can be concluded: The invention relates to a method and an arrangement for producing body components (48) being provided with an acoustically-effective silencing material layer (44). The aim of the invention is to enable fully automatic packaging making use of the silencing material layer (44). The silencing material that consists of a plastic material which can be cured in a thermal manner is applied onto a flat surface of a body component in a pasty, moisture-absorbing form as a layer (44), and the exposed side of the silencing material layer is covered with a cover layer (46) that facing the body component flat surface. The over layer consists of moisture-impermeable material. The thus pre-packed body component (48) can be randomly transported, intermediately stored and/or supplied for further processing under exposure to air. Curing of the silencing material (44) is only carried out in a subsequent procedure step, for example in an enameling oven.

What is claimed is:

1. A process for producing a pre-packed vehicle body component comprising:
   a) applying a silencing material layer (44) comprising a thermosetting material in viscous state directly onto a broad face of a pre-assembly vehicle body component (48);
   b) applying a non-releasable moisture impermeable cover layer (46) on top of the silencing material layer (44);
   c) optionally storing the vehicle body component under exposure of air; and
   d) painting and heating the vehicle body component with simultaneous curing of the silencing material layer (44).

2. A process according to claim 1, wherein the silencing material (44) is extruded over a large surface area on a broad surface of the pre-assembly vehicle body component (48) by use of a broad slit nozzle (10).

3. A process according to claim 2, wherein the cover layer (46) is applied during co-extrusion in pasty form simultaneously with the silencing material (44).

4. A process according to claim 1, wherein the cover layer (46) is drawn from a supply roll in the form of a foil (66) and during the application of the silencing material (44) is surface-bonded to the exposed surface of the silencing material.

5. A process according to claim 4, wherein the foil (66) is drawn from a contouring roller (60) and is contour-fittingly applied to the silencing material layer.

6. A process according to claim 5, wherein the foil (66) is provided, via circumference ridges in the contour roller (60), with material displacing folds or corrugations.

7. A process according to claim 4, wherein the foil (66) is a metal foil, preferably an aluminum foil.

8. A process according to claim 4, wherein the foil (66) is a plastic foil.

* * * * *